Dec. 27, 1955   R. L. HOENK   2,728,091
APPARATUS FOR AND METHOD OF ASSEMBLING
WASHERS AND NUT ELEMENTS
Filed Oct. 11, 1951   7 Sheets-Sheet 1
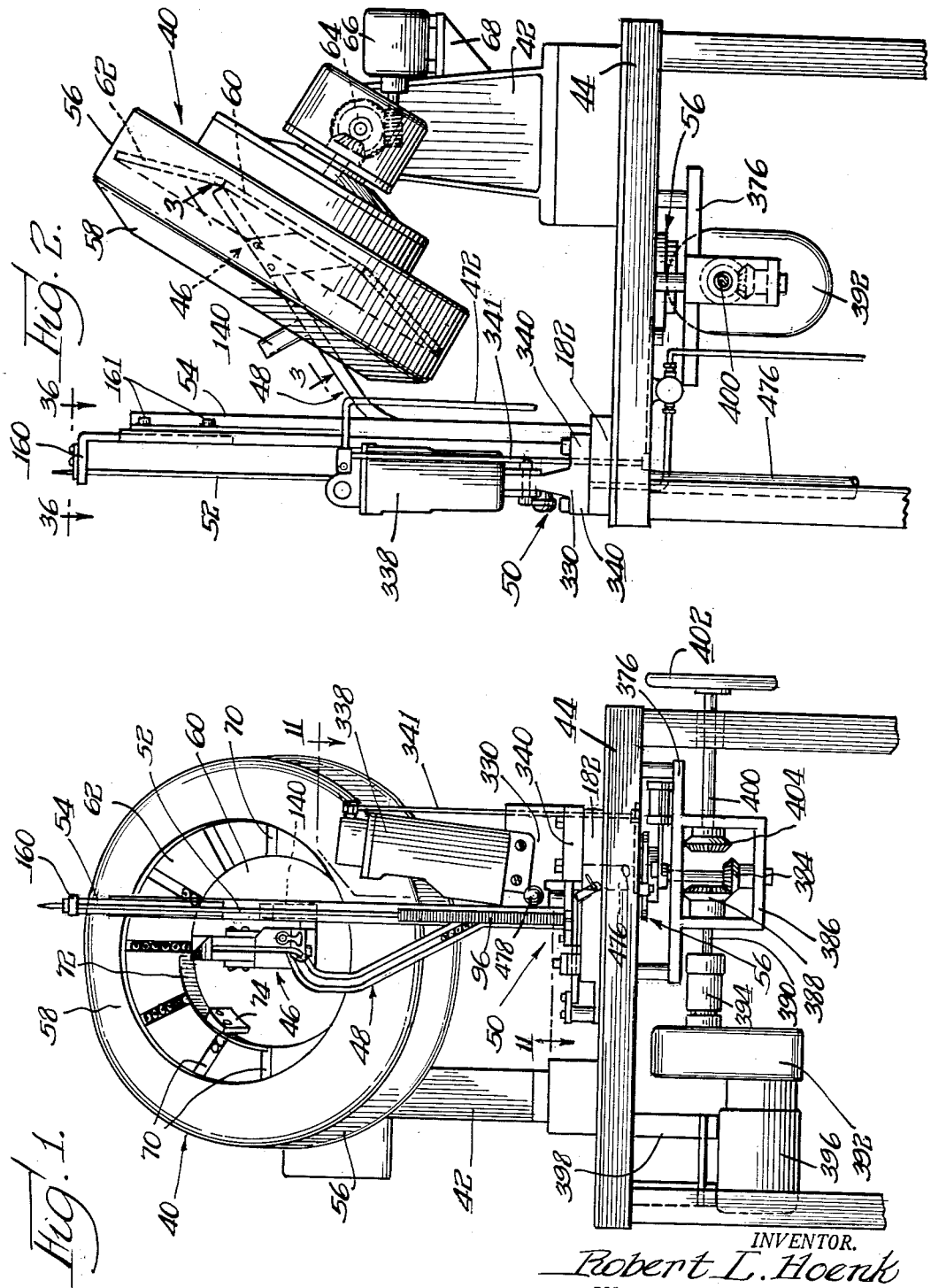
INVENTOR.
Robert L. Hoenk
BY
Moore, Olson & Trexler
Attys.

Dec. 27, 1955 R. L. HOENK 2,728,091
APPARATUS FOR AND METHOD OF ASSEMBLING
WASHERS AND NUT ELEMENTS
Filed Oct. 11, 1951 7 Sheets-Sheet 2
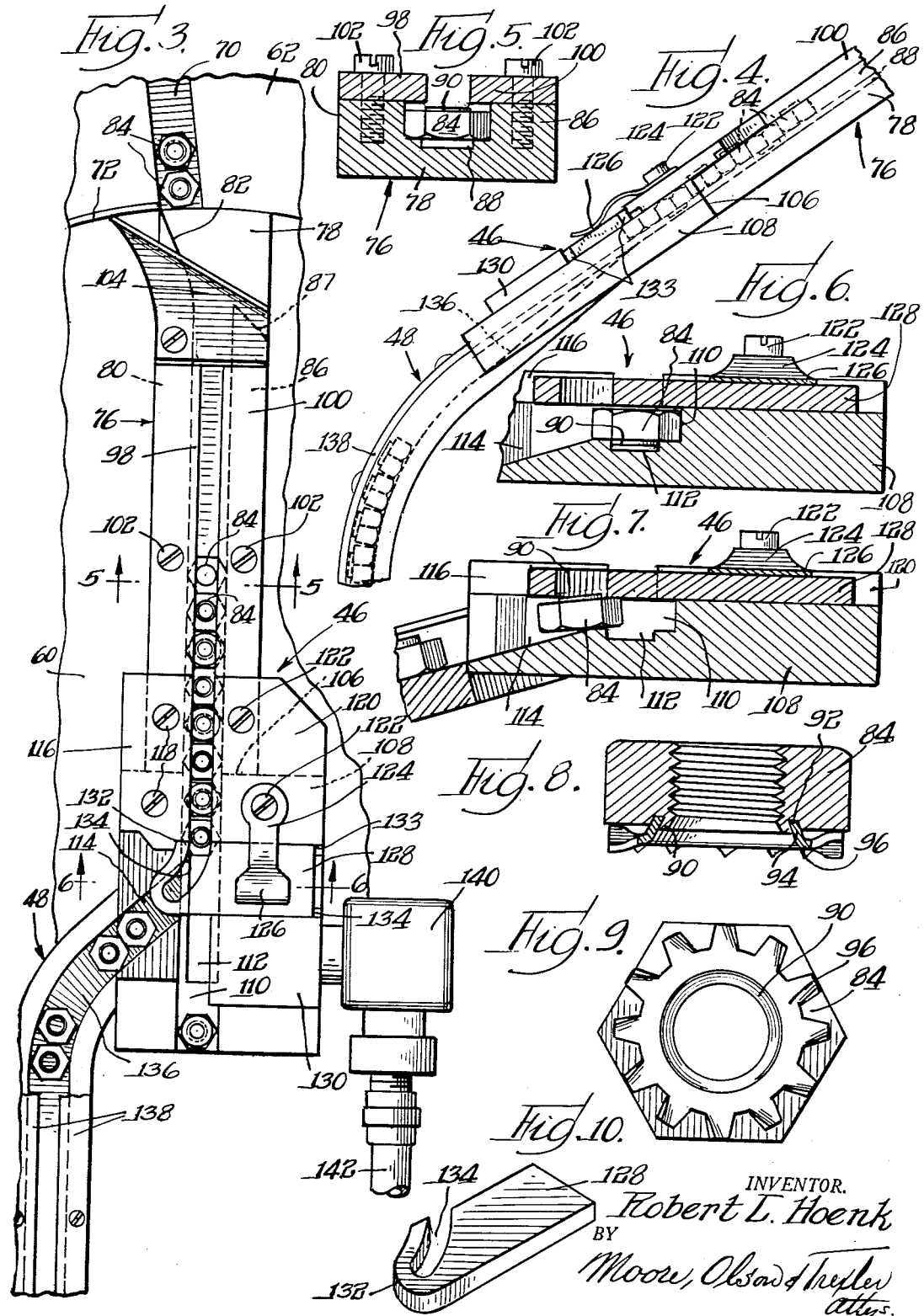
INVENTOR.
Robert L. Hoenk
BY
Moore, Olson & Trexler
attys.

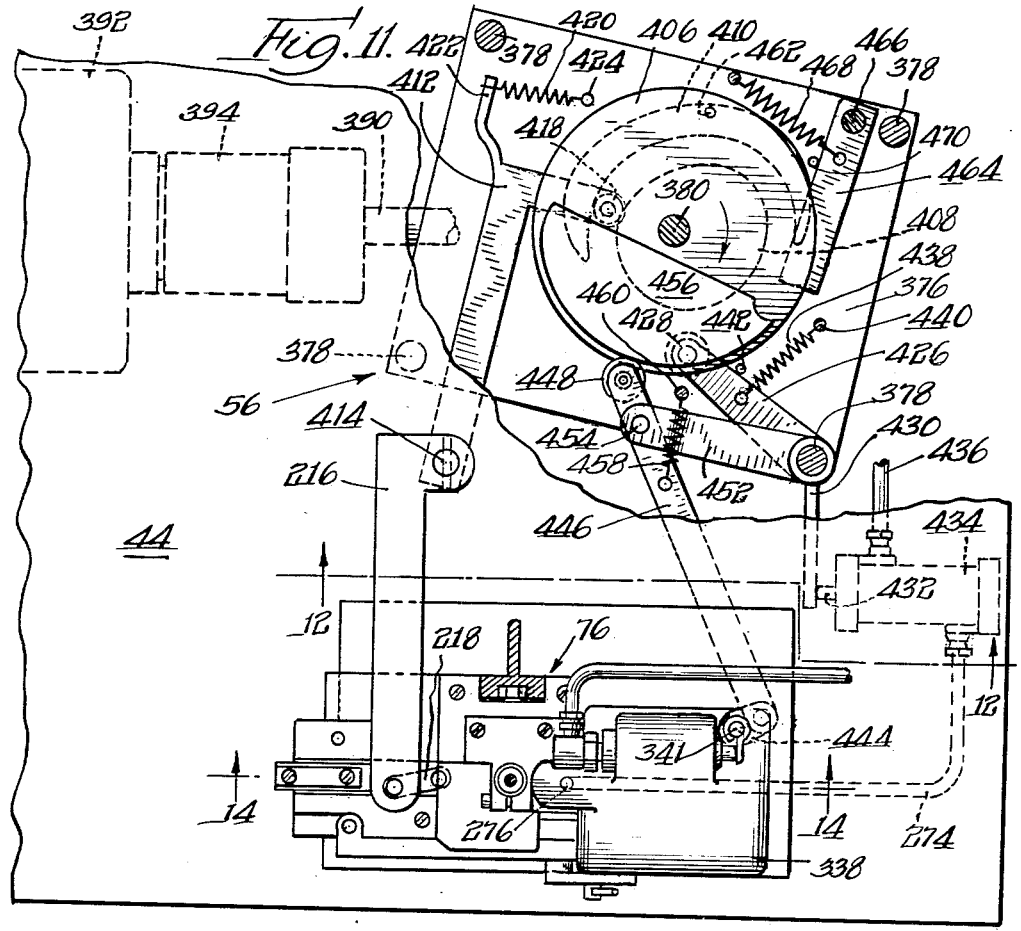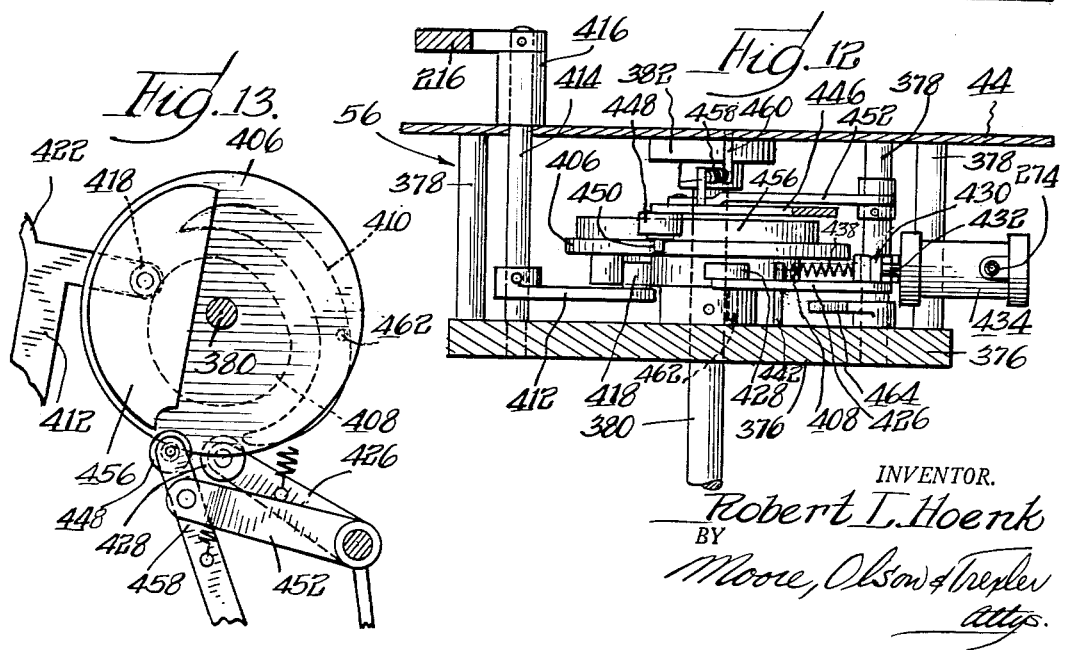

Dec. 27, 1955
R. L. HOENK
2,728,091
APPARATUS FOR AND METHOD OF ASSEMBLING
WASHERS AND NUT ELEMENTS
Filed Oct. 31, 1951
7 Sheets-Sheet 4
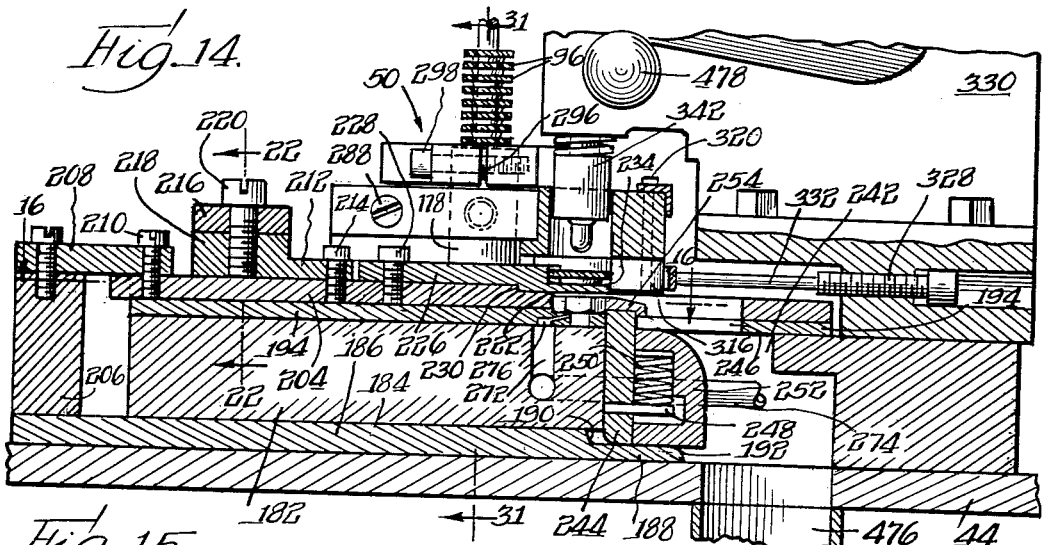
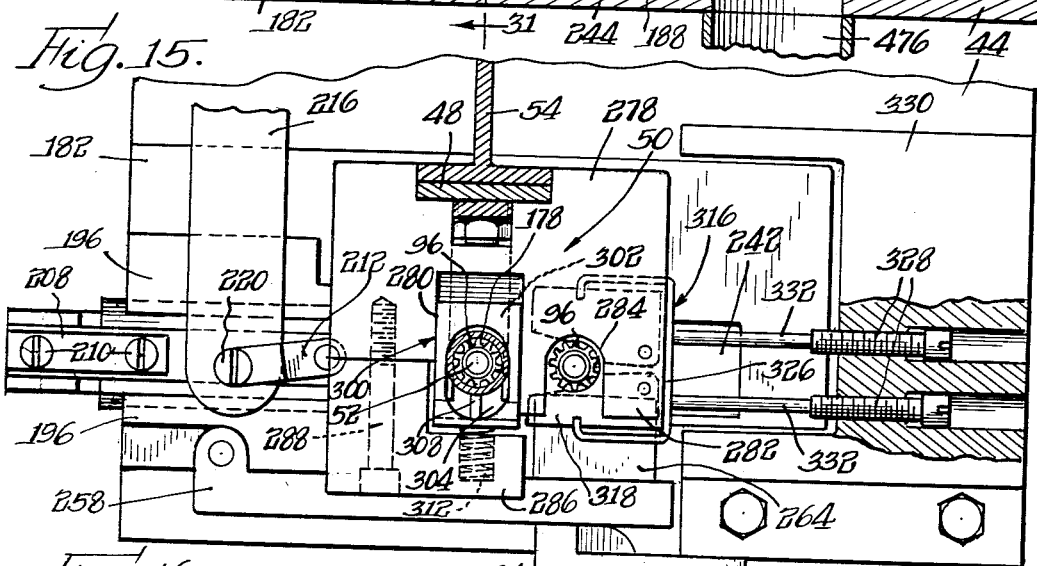
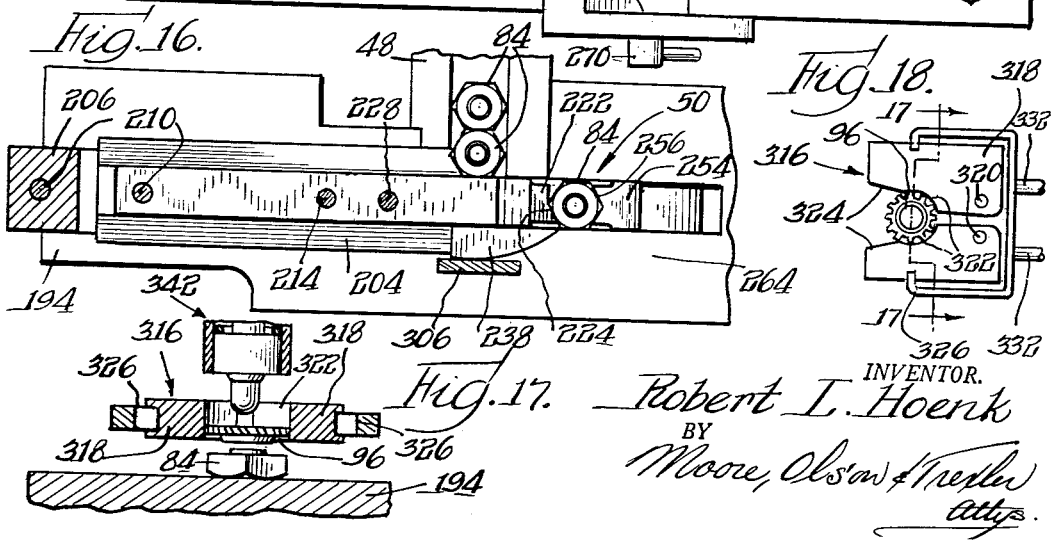
INVENTOR.
Robert L. Hoenk
BY
Moore, Olson & Trexler
Attys.

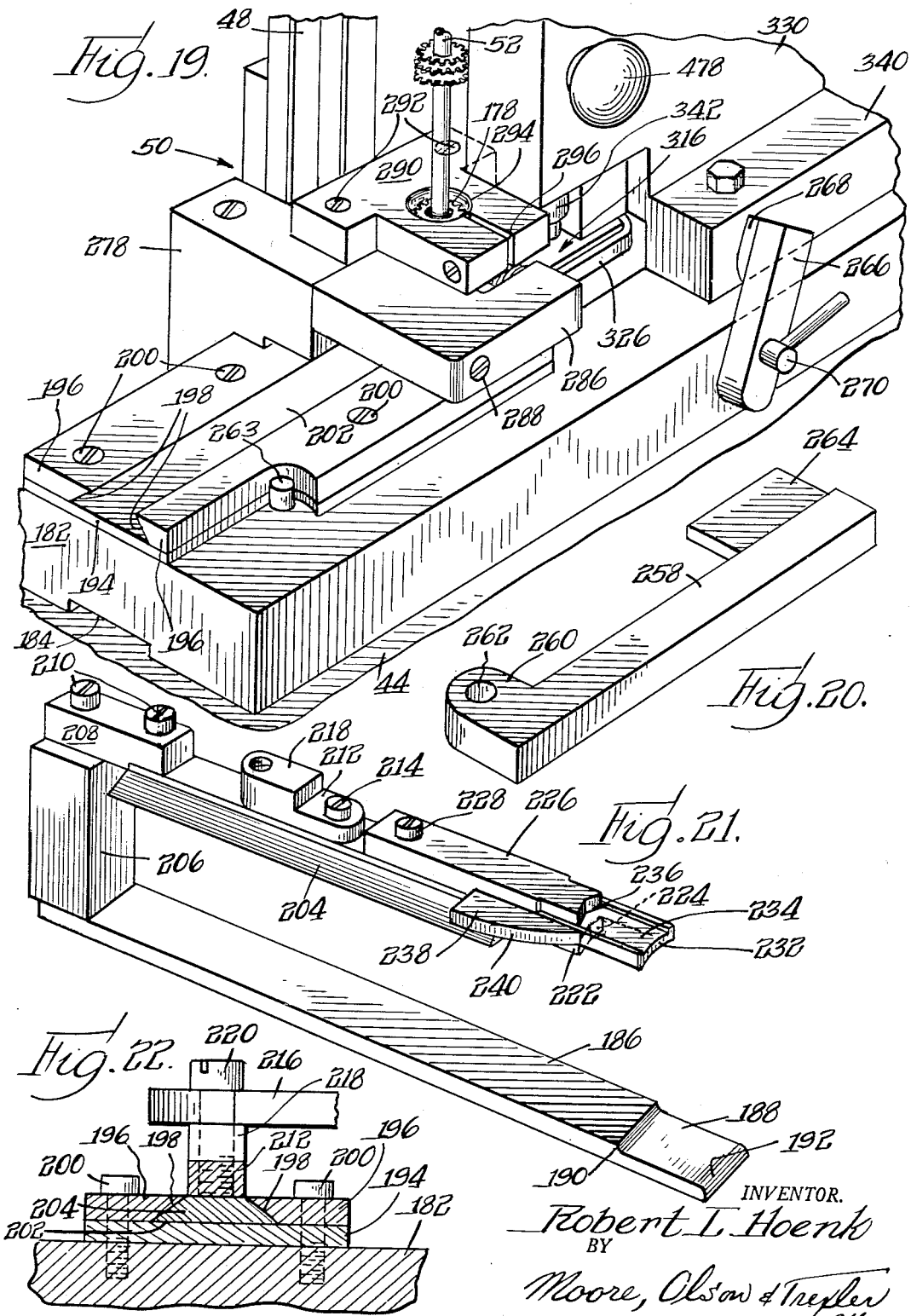

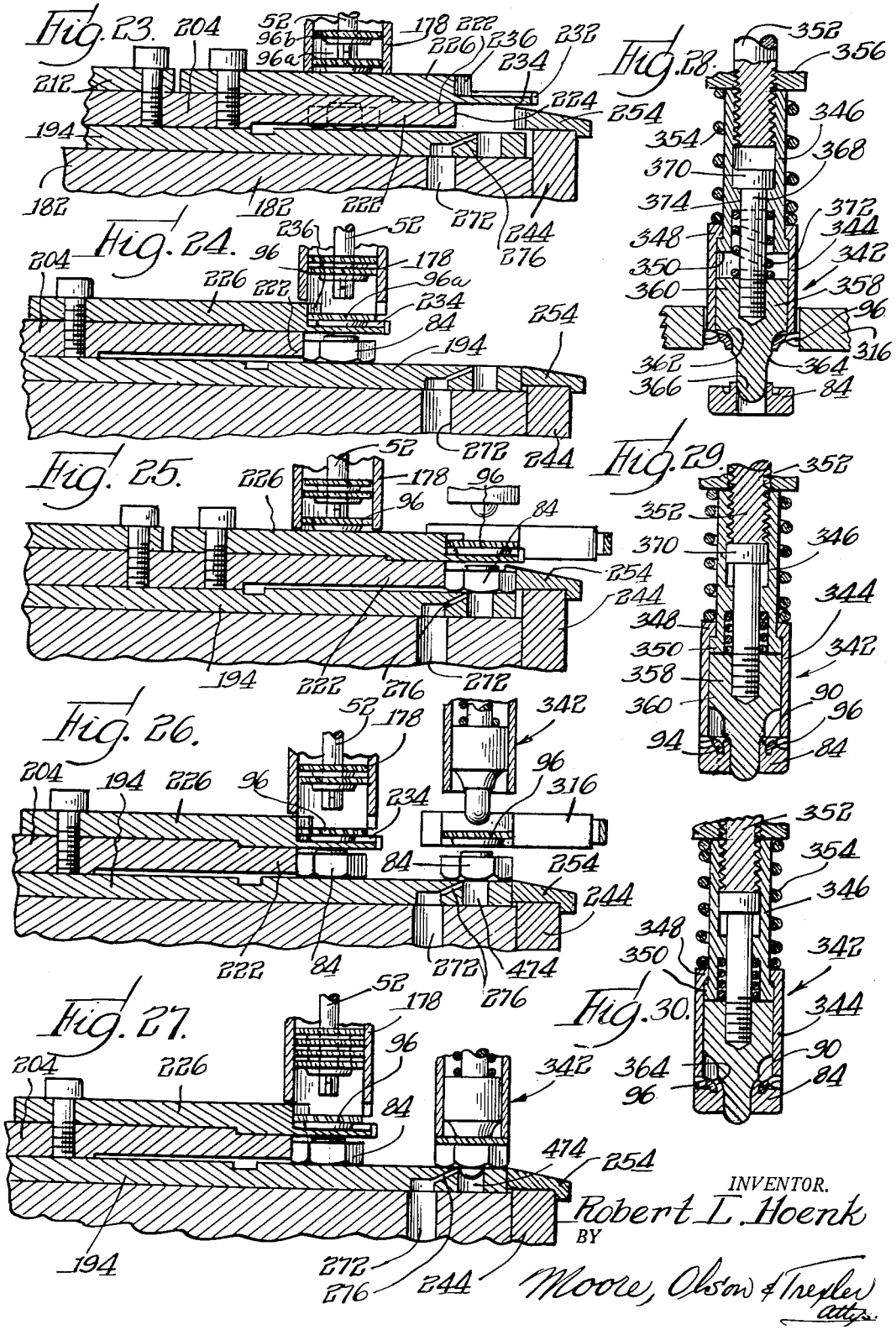

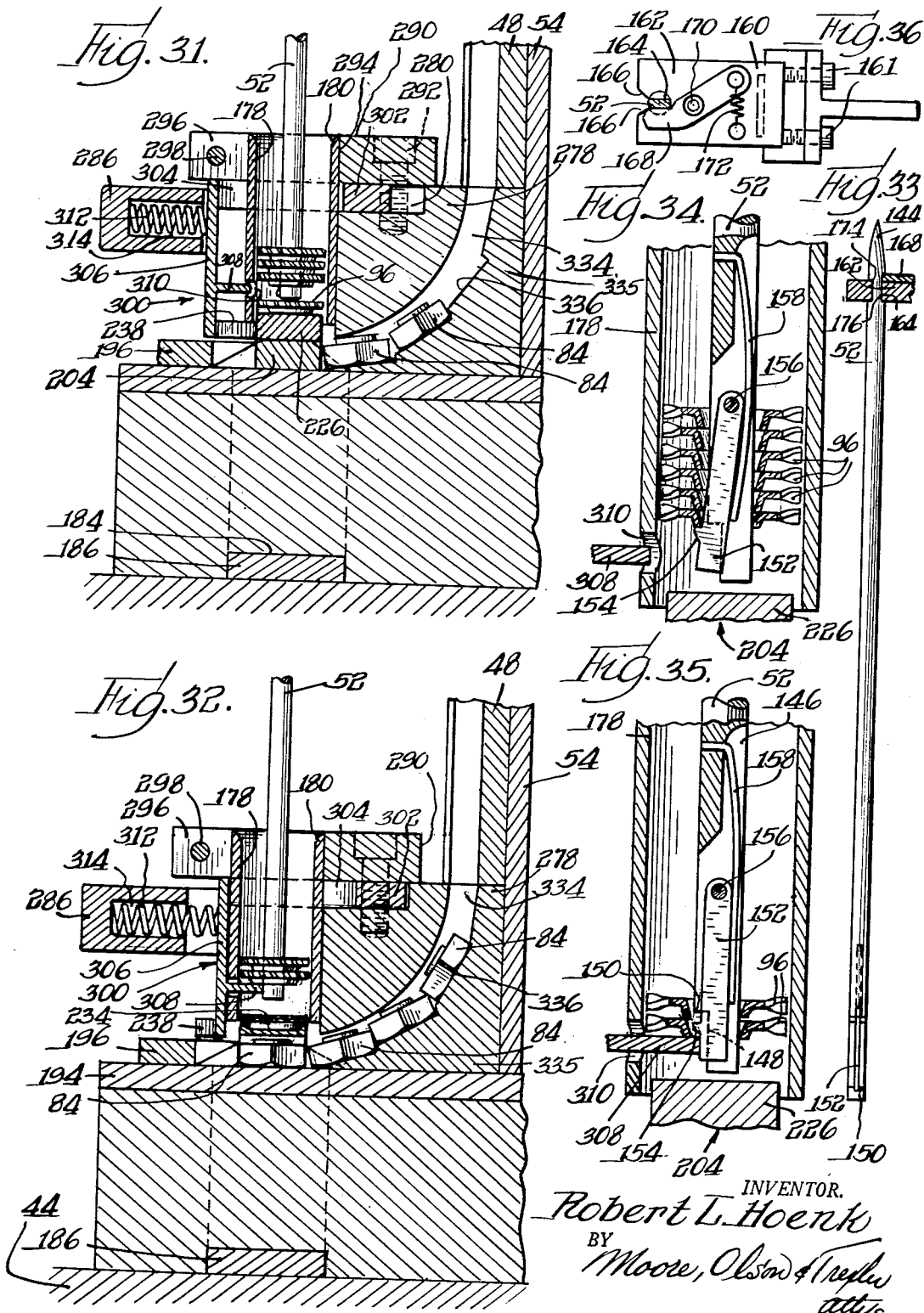

United States Patent Office 2,728,091
Patented Dec. 27, 1955

2,728,091

APPARATUS FOR AND METHOD OF ASSEMBLING WASHERS AND NUT ELEMENTS

Robert L. Hoenk, Chicago, Ill., assignor to Illinois Tool Works, Chicago, Ill., a corporation of Illinois Application October 11, 1951, Serial No. 250,900

20 Claims. (Cl. 10—155)

This invention is concerned generally with the assembling of washers and nut elements and particularly with a machine for a method of assembling toothed lock washers and nut elements wherein either or both of the washers and nut elements have substantially axially extending flanges, collars, fins, or other protuberances.

An object of this invention is to provide a new or improved machine for and method of assembling toothed lock washers and nut elements having axially extending fins.

A specific object of this invention is to provide an apparatus for and a method of selecting and feeding flanged nut elements according to the orientation of their flanges.

Considerable difficulty has been found in feeding twisted tooth, conical rim lock washers due to binding and interlocking of the washer teeth and the tendency of the conical rims to wedge under guide structure. I have found that such lock washers can be fed vertically from a vertical stack with no binding or wedging of the washers with one another or with any of the feeding structure. I have found assembly directly beneath a vertical magazine to be impracticable and have devised a suitable mechanism and method for shifting lock washers one by one from beneath a vertical magazine to an assembly station.

An object of this invention is to provide an apparatus for and method of feeding lock washers one by one from a receiving station beneath a vertical magazine to an assembly station.

Another object of this invention is to provide an apparatus for and a method of aligning toothed lock washers and nut elements and then feeding the aligned washers and nut elements rectilinearly to an assembly station for assembly with no reaction on the aligning means.

A further object of this invention is to provide an apparatus for feeding toothed lock washers vertically one at a time from a vertical stack of such washers, aligning the washers with nut elements, and feeding the aligned washers and nut elements clear of said vertical stack to a station for telescopic assembly.

Another object of this invention is to provide, in an apparatus for assembling nut elements and lock washers, a new or improved mechanism for releasing lock washers one by one from a stack of such washers.

A further object of this invention is to provide, in an apparatus for assembling nut elements and toothed lock washers, means for relatively telescoping spaced apart axially aligned washers and nut elements and swaging the nut element to retain said nut element and washer permanently assembled.

Other and further objects and advantages of the present invention will be apparent from the following description when taken in connection with the accompanying drawings wherein:

Fig. 1 is a front view of an assembly machine embodying the principles of my invention;

Fig. 2 is a side view of the machine;

Fig. 3 is an enlarged detailed view of the nut element selector mechanism taken substantially along the line 3—3 of Fig. 2;

Fig. 4 is a view of the nut element selector mechanism taken from the right of Fig. 3;

Fig. 5 is a cross-sectional view taken along the line 5—5 of Fig. 3;

Fig. 6 is a cross-sectional view taken along the line 6—6 of Fig. 3 showing a nut element with the flange downwardly directed;

Fig. 7 is a view similar to Fig. 6 showing a nut element with the flange upwardly directed;

Fig. 8 is a sectional view of an assembled nut element and lock washer taken along the longitudinal axis thereof;

Fig. 9 is a view of an assembled nut element and washer taken from the washer end thereof;

Fig. 10 is a perspective view of the part of the nut element selector for directing nuts having their flanges upwardly directed into the nut supply chute;

Fig. 11 is a top view of the driving and control mechanism of the machine taken substantially along the line 11—11 in Fig. 1 and with certain parts broken away;

Fig. 12 is a side view partially in section taken substantially along the line 12—12 of Fig. 11;

Fig. 13 is a fragmentary view similar to Fig. 11 showing the operating parts in different positions;

Fig. 14 is a cross-sectional view taken substantially along the line 14—14 of Fig. 11;

Fig. 15 is a top view of the mechanism shown in Fig. 14 with certain parts shown in section and others broken away;

Fig. 16 is a top view partially in section taken along the line 16—16 of Fig. 14;

Fig. 17 is a sectional view taken substantially along the line 17—17 of Fig. 18;

Fig. 18 is a fragmentary view of the washer holding mechanism shown also in Fig. 15;

Fig. 19 is a fragmentary view in perspective of the assembly mechanism;

Fig. 20 is a perspective view of a locking member interfitting with the mechanism of Fig. 19;

Fig. 21 is a perspective view of the nut element and washer transfer slide interfitting with the mechanism of Fig. 19;

Fig. 22 is a sectional view taken substantially along the line 22—22 of Fig. 14;

Figs. 23-27 are enlarged cross-sectional views similar to a portion of Fig. 14 showing the slide in different operative positions;

Figs. 28-30 are cross-sectional views of the telescoping and swaging mechanism shown in different positions of operation;

Fig. 31 is a cross-section view taken substantially along the line 31—31 of Fig. 14;

Fig. 32 is a view similar to Fig. 31 with the parts in different positions;

Fig. 33 is a view of the washer supply rod;

Figs. 34 and 35 are sectional views showing the release of washers from the supply rod; and Fig. 36 is a view taken from above Fig. 33 and substantially along the line 36—36 of Fig. 2 showing the supporting mechanism for the washer supply rod.

A general understanding of my invention can be had by referring first to Figs. 1 and 2 wherein there is shown an assembly machine embodying the principles of my invention. Nut element supply mechanism includes a nut hopper 40 supported by a bracket 42 on a base or table 44. Nut elements from the hopper pass through a nut selector 46 and a nut chute 48 to an assembly mechanism 50.

Washer supply mechanism includes a rod 52 carrying a vertical stack of lock washers and supported at the upper end by a bracket 54 upstanding from the table 44. The washers are fed by gravity to the assembly mechanism 50 for assembly with the nut elements from the chute 48. The assembly mechanism controls the release of nut elements and washers and in turn is driven by control and driving mechanism 56 on the under side of the table 44.

The nut element supply mechanism

The nut element supply mechanism includes the hopper 40 supported by the bracket 42 as aforementioned. The hopper is of conventional construction adapted to supply nut elements to a chute or track with either face of the nut element up and includes a stationary casing 56 angularly disposed and having an inwardly directed rim 58. The hopper further includes a stationary central plate 60 and a rotatable frusto-conical ring 62 interposed between the plate 60 and the casing 56. The ring 62 is driven through suitable drive mechanism including gears 64 from a motor 66 carried by an auxiliary bracket 68 on the hopper supporting bracket 42. The ring 62 is provided with a plurality of elongated grooves or recesses 70 lying along elements of the frusto-conical ring. Nut elements dumped in a random mass in the lower portion of the casing 56 collect in the recesses 70 as the recesses pass through the lower portion of the hopper and are carried toward the upper portion of the hopper by rotation of the ring 62. An arcuate plate 72 is carried by a block 74 in a position substantially perpendicular to the central plate 60 and lies along the inner edge of the ring 62 over an arc of at least 90° to retain nut elements in the grooves 70 as they approach the upper portion of the hopper.

The nut selector 46 (see also Figs. 3–10) includes a chute or track 76 having a bottom plate 78 substantially contacting the inner edge of the ring 62 and on a level with the bottoms of the grooves or recesses 70 at the inner ends thereof. A first guide rail 80 is secured along one longitudinal edge of the plate 78 and extends to the upper edge of the plate 78, the guide rail 80 having its inner edge relieved at the upper end at 82 to centralize nut elements 84 passing from the grooves 70 on to the plate 78. A second longitudinal guide rail 86 lies along the opposite edge of the plate 78 and is spaced from the guide rail 80 just slightly greater than the maximum diameter of the nut elements 84. The upper end of the guide rail 86 is beveled at 87 to facilitate passage of nut elements from the plate 78 when the space between the rails 80, 86 is completely filled. The plate 78 and rails 80 and 86 preferably are formed integral as shown in Fig. 5. The plate 78 is provided with a longitudinal recess 88 of proper size to accommodate the flange 90, sometimes known as a neck or stub shaft, of a nut element 84. The flange 90 has been exaggerated in axial extent for illustrative purposes and extends parallel to the axis of the nut before being staked or swaged for permanent assembly of the nut with a lock washer. An annular groove 92 surrounds the neck or rim 90 as shown in Fig. 8 for receiving the flange or rim 94 of a twisted tooth lock washer 96.

Longitudinal retainer strips 98 and 100 are secured along the upper edges of the guide rails 80 and 86 by suitable means such as screws 102 and overlie the space between the rails to retain the nut elements in proper position in the chute or track 76. An upwardly curved deflecting plate 104 is secured on the upper end of the chute or track 76 for insuring proper seating of nut elements beneath the retainer strips 98 and 100. The upper edge of the plate 104 is angled similarly to the beveled or relieved rail ends 82 and 87 to direct nut elements back into the hopper if they should slide from the grooves 70 piled on top of one another.

The chute or track 76 is terminated at its lower end at 106 and a relatively wide block 108 is suitably fixed to the lower end of the chute and is longitudinally recessed at 110 to provide a continuation of the chute 76. A narrow longitudinal recess 112 is provided in the bottom of the recess or groove 110 to provide clearance for the necks or stub shafts of the nut elements. The block is provided with a further recess or groove forming a side track 114 branching from the longitudinal groove 110.

A plate 116 is secured by means such as screws 118 to the top of the block 108 and to the top of the guide rail 80 and forms a continuation of the retaining strip 98. Similarly, a plate 120 is secured to the top of the block 108 and to the top of the guide rail 86 by means such as screws 122. The lowermost screw 122 additionally secures a leaf spring 124 having a broad tongue portion 126 bearing upon and holding down a plate 128 fitting on top of the block 108 and between the plate 120 and a plate 130.

The plate 128 as particularly may be seen in the perspective view of Fig. 10 has a rounded outer end portion 132 and a recess 134 curving into this end portion. The recess 134 leads directly into the side track 114 as best may be seen in Fig. 3.

Nut elements passing down the chute with their fins or stub shafts 90 downwardly directed pass into the block 108 with the stub shafts fitting in the narrow recess 112 as shown in Fig. 6 and pass under the plate 128 and continue down the groove or track 110 and drop back into the hopper. Nut elements which have their fins or stub shafts upwardly directed have the stub shaft engaged by the slot or recess 134 of the plate 128 as shown in Fig. 7 and thus are directed into the side track 114. Endwise motion of the plate 128 (transversely of the chute 76 and block 108) is prevented by interfitting of the plate 128 with the plate 116 at 132 and by flange means 133 either on the block 108 or on the plates 120 and 130 and extending beyond the outer end of the plate 128.

The side track 114 leads into the chute 48 which is provided with a central nut carrying groove 136 and overlying retainer strips 138.

To insure proper jam free feeding of nut elements through the selector 46 and the chute 48, an air vibrator 140 is secured to the side of the selector. The air vibrator is of conventional construction and is supplied with air under pressure through a pneumatic line or hose 142.

The washer supply mechanism

Lock washers 96 are supplied in a vertical stack on the rod 52 supported by the bracket 54 as already indicated. The lower end of the rod is not supported and is positioned by positioning the washers carried thereon as will be brought out presently. The rod (Figs. 33–36) is cylindrical in form and is provided with a tapered or pointed upper end 144 to facilitate the stacking of washers thereon. The lower end of the rod 52 is longitudinally slottted at 146 and is notched or relieved at 148 to provide a shoulder 150. A latch 152 having a detent 154 is pivoted in the longitudinal slot 146 at 156 and a spring 158 urges the latch 152 outwardly to position the detent below a stack of washers 96 on the rod as shown in Fig. 34.

The upper end of the bracket 54 includes an angle member 160 (Figs. 1, 2 and 36) secured to the bracket by a sliding connection which can be locked in adjusted position by means of bolts or screws 161. The angle member 160 has an upper plate 162 provided with a slot 164 opening toward the outer end of the upper plate and provided with beveled corners 166. A latch 168 is pivoted on the top plate at 170 and is urged over the slot 164 by a spring 172 stretched between apertures in the upper plate 162 and the tail of the lever 168.

The washer rod 52 is chordally notched at 174 and at 176 for fitting into the slot 164 of the upper plate 162 with the latch 168 fitting into the notch 176. A fixed washer tube 178 encircles the lower end of the rod properly to position the washers and thereby to position the lower end of the rod. The upper edge of the washer tube is internally beveled at 180 (Figs. 31 and 32) to facilitate the entrance of washers thereinto.

The assembly mechanism

Reference next should be had to Figs. 14-22 for the details of construction of the assembly mechanism 50. The assembly mechanism includes a base or block 182 suitably mounted on the table 44. The block 182 is provided on its under surface with a groove or slot 184 for accommodating a nut positioning cam 186. The nut positioning cam 186 is in the form of a flat strap having a relieved end 188 joining the remainder of the strap at a smoothly curved shoulder 190. The end of the relieved portion is rounded off at 192.

The upper surface of the block 182 is provided with a hardened strip 194. Undercut guide strips 196 having beveled confronting edges 198 are secured to the strip 194 and to the block 182 by means such as screws 200. The strip 194 and strips 196 form a slideway 202 which receives a dovetailed transfer slide 204. The slide 204 is rigidly interconnected with the nut positioning cam 186 by means of a square post 206 upstanding from the rear end of the cam and a link 208 fixed on the post and on the slide by screws 210.

The slide 204 is provided with a link 212 pivotally secured on the upper side of the slide by suitable means such as a screw 214. An actuating arm 216 is pivotally connected to a raised portion 218 of the link 212 by means of a screw 220.

The slide 204 is provided with a forwardly projecting portion 222 terminating in a V-shaped end 224. A washer positioning member 226 is secured above the end of the slide 204 by means such as a screw 228 and interfitting shoulder portions 230 (Fig. 14). The washer positioning member 226 is concave at its outer end at 232 and is provided with a recessed seat 234 on its upper surface terminating in a substantially V-shaped abutment or shoulder portion 236. The washer positioning member 226 further is provided on one side with a substantially wedge-shaped cam 238 having a curved actuating surface 240.

The block 182 is recessed at 242 (Figs. 14 and 15). A vertically reciprocable slide 244 (Fig. 14) extends through this recess and through an aperture 246 in the plate 194. A pin 248 extending from the slide 244 is engaged by a coil spring 250 in a housing member 252 within the recess 242 for normally urging the vertically reciprocable slide 244 downwardly. The upper end of the slide 244 is provided with a back-up member 254 having a V-shaped edge 256 (Fig. 16) confronting the V-shaped edge 224 of the transfer slide 204. The vertically reciprocable slide 244 is cammed upwardly by the tip 188, 192 of the nut positioning cam 186 as the transfer slide 204 is shifted longitudinally so that the back up member 254 coacts with the V-shaped forward end 224 of the slide 204 to position a nut element 84 for telescopic assembly with a washer.

The space between the end 224 of the transfer slide and the back up member 254 is closed from the rear by an extension of the guide strip 196 and is accessible from the front. An arm 258 fits alongside the strip 194 and the forward rail or strip 196. The arm 258 (Fig. 20) is provided with a transverse ear 260 apertured at 262 to fit over a pin 263 (Fig. 19) upstanding from the block 182 in a cutback portion of the plate or strip 194 and the forward rail or strip 196. The arm further is provided at its free end with a plate-like section 264 closing the space between the end 224 of the transfer slide and the back-up member 254 and has its top surface substantially on a level with the top of the guide strips 196 to fit beneath the cam 238. The stop 266 (Fig. 19) is pivoted on the side of the block 182 and is provided with a wedge-like projection 268 for locking the arm 258 in position. A clamping screw 270 having a transverse handle provides the pivotal mount for the stop 266 and clamps the stop in position.

The block 182 is bored at 272 (Fig. 14) and is connected to an air hose 274. The bore 272 communicates with a suitable nozzle 276 in the plate 194 for ejecting assembled nut elements and washers from the apparatus.

A block 278 (Figs. 15 and 19) is located at the base of the nut chute 48, the nut chute at that location lying along the front of the bracket 54 supporting at its upper end the top of the washer supply rod 52. The block 278 partially overlies the slideway 202 and the slide 204 therein and includes a cut out portion 280 and a forwardly extending section 282 immediately adjacent to the cut out portion 280. The forwardly extending section 282 includes a substantially U-shaped recess 284. An L-shaped arm 286 is bolted to the block 278 at 288.

A substantially T-shaped mounting block 290 (Figs. 19, 31, and 32) is screwed or bolted to the block 278 at 292. The mounting block 290 is provided with a circular aperture 294 directly above the recess 280 (Fig. 31) and also above the space between the block 278 and arm 286, this space being in part aligned with the recess 289. A slot 296 is provided leading from the aperture 294 to the forward end of the block 290. A screw or bolt 298 is provided for clamping the mounting block 290 about the upper end of the washer tube 178.

A washer feed control member 300 (Figs. 15, 31, and 32) is mounted adjacent the washer tube 178 and includes a horizontal plate-like portion 302 reciprocably fitting in the recess 280 and having an elongated aperture 304. The washer tube 178 fits within the aperture 304. A vertical wall 306 extends downwardly from the horizontal portion 302 and is adapted at its lower end for cooperative engagement with the cam 238 on the slide 204. A washer release member 308 extends horizontally from the vertical wall portion 306 through an aperture 310 in the washer tube 178 (see also Figs. 34 and 35). A coil spring 312 is housed in a bore 314 in the arm of the L-shaped block 286 and urges the washer release member 309 toward the washer tube 178 and washer supply rod 52.

The cam 238 holds the washer feed control member 300 in retracted position when the slide 204 is in its forward position as shown in Figs. 16, 31, and 34. The detent 154 of the latch 152 supports the stack of washers 96 on the supply rod 52. When the slide is retracted rearwardly the cam 238 allows the washer feed control member 300 to be advanced under the action of spring 312. The arm 308 strikes the latch 152 (Figs. 32 and 35) and shifts the detent 154 from beneath the washer stack which shifts downwardly substantially the thickness of one washer and is supported on the arm 308. Subsequent advancement of the slide 204 cams the washer feed control member 300 to its retracted position to engage the detent 154 beneath all but the lowermost of the washers 196, this washer dropping on top of the washer positioning member 226 of the slide 204 as shown in Fig. 32. Subsequent retraction of the slide 204 allows the released washer to drop on the member 234 of the slide 204 for advancement to assembly position.

A washer gripper mechanism 316 (Figs. 14, 15, and 17-19) is positioned beneath the forwardly extending section 282 of the block 278 and includes a pair of leaves or gripper members 318 pivotally connected to the block 278 at 320. The leaves are provided with arcuate portions cooperating to form a circular recess 322 somewhat greater than a semicircle in extent. Diverging edges form a guideway 324 into the recess 322. A U-shaped spring 326 encircles the leaves 318 and normally urges the leaves toward one another. Adjusting screws 328 are threaded into countersunk bores in a hammer base 330 and are provided with axially extending rods 332 bearing against the spring 326 for adjusting the tension thereof. When the slide 204 is advanced, the washer positioning member 226 forces a washer 96 into the recess 322 between the leaves 318 where the washer is held for assembly with a nut element.

The lower end of the nut chute 48 terminates against the upper end of the block 278 and the block is formed with a nut element passageway 334 (Figs. 31 and 32) curving from substantially vertical position at its junction with the chute 48 to substantially horizontal position beneath the washer tube 178 and adjacent the nut positioning portion 222 of the transfer slide 204. The passageway is formed by removing a section of the block 278 and securing a plug 335 therein. The lower or supporting surface 336 of the passageway 334 constitutes the front of the plug 335. Surface 336 is substantially saw toothed in configuration to facilitate proper advancement of the nut elements free from jamming and to prevent the weight of the entire stack of nuts from bearing directly against the slide 204.

Assembly of the washers and nut elements is effected by a pneumatic hammer 338 (Figs 1 and 2) mounted on the hammer base 330. The hammer base is secured to the block 182 by means of bolts passing through transverse flanges 340 on the hammer base and threaded into the block 182. Actuation of the hammer is controlled by a control rod 341 leading from a valve beneath the table 44 as will be brought out hereinafter.

The operating or assembly member of the pneumatic hammer 338 comprises a staking plunger 342 (Figs. 14, 17, and 28–30) including a washer engaging thimble 344 fitting over a sleeve 346 and secured thereon by interlocking annular flanges 348 and 350. The sleeve 346 is threaded on to a reciprocable rod 352 extending from the bottom of the pneumatic hammer and forming the reciprocable portion of the hammer. A coil spring 354 encircles the sleeve 346 and is trapped between the flange 348 and a nut member or collar 356 threaded on the rod 352 normally to urge the thimble 344 down.

A swaging head 358 slidably fits within the thimble 344, and has a cylindrical body-portion 360. A concave section 362 leads to a work-swaging shoulder portion 364 which in turn joins a centering tip 366 having a rounded off end inuring proper centralization of nut elements 84.

A stud 368 is threaded into the head 358 and has a head 370 fitting in the sleeve 346 beneath the end of the rod 352. A coil spring 372 is trapped between the head 358 and an inwardly directed flange 374 in the sleeve 346. The spring 372 normally urges the head 358 outwardly of the thimble 344 and outward movement is limited by the engagement of the head 370 against the flange 374.

The driving mechanism

The control mechanism 56 as heretofore indicated is located on the under side of the table 44. As shown generally in Figs. 1 and 2 and more particularly in Figs. 11–13 the control mechanism 56 includes a plate 376 supported and spaced below the table 44 by a plurality of legs 378. A shaft 380 is suitably journaled in the plate 376 and in a bearing mount 382 on the under side of the table 44. A bevel gear 384 is fixed on the shaft near the lower end thereof and the lower end of the shaft is journaled in a suitable bearing carried by a bracket 386 depending from the plate 376. The bevel gear 384 is driven by a bevel gear 388 on a drive shaft 390 suitably journaled in the bracket 386. The drive shaft 390 is driven by speed reducing mechanism 392 through a clutch 394. The speed reducing mechanism 392 preferably is adjustable for varying the output speed and is driven by a motor 396 carried by a suitable bracket 398 depending from the table 44.

Provision is made for operating the machine by hand for adjustment of the parts and this provision includes a shaft 400 journaled in the bracket 386 and in a bracket (not shown) depending from the table 44 near the edge thereof opposite the motor 396. The shaft 400 is rotatable by means of a hand wheel 402 and is provided with a bevel gear 404 shiftable into engagement with the bevel gear 384 by manually shifting the shaft 400 axially.

A cam wheel 406 is fixed on the shaft 380 for rotation therewith. The cam wheel 406 is provided with a central cam 408 and a crescent shaped cam 410. An L-shaped lever 412 is fixed at one end to a pivot rod 414 journaled in the plate 376 and in a bearing 416 upstanding from the table 44. A cam roller 418 is rotatably carried on the other end of the lever 412 and is urged against the cam 408 by a spring 420 stretched between a tail 422 extending from the lever and a pin 424 fixed on the plate 376. The arm 216 connected to the link 218 for shifting the slide 204 back and forth is fixed to the shaft 414 for pivotal movement therewith so that movement of the slide is controlled by the lever 412 and cams 408 and 410.

A bell crank or lever 426 is pivoted on one of the legs 378 and is provided with a cam follower roller 428 engageable with the outside of the crescent shaped cam 410. The other arm 430 of the lever 426 engages a plunger 432 of an air control valve 434. The air control valve 434 is supplied with air under pressure through a pneumatic line 436 and the outlet of the valve 434 is connected through the pneumatic line 274 to the ejector bore or nozzle 276 for ejecting completed assemblies from the apparatus. The cam follower roller 428 is urged toward the cam 410 by a spring 438 stretched between the arm of the lever 426 carrying the cam follower roller 428 and a post 440 on the plate 376. Movement of the lever under the influence of spring 438 is limited by a pin 442. It will be seen that engagement of the roller 428 by the cam 410 will pivot the lever 426 rapidly at first to cause a sharp on-set of the blast from the ejector nozzle 276, which blast then tapers off as the roller moves along the outside of the cam 410.

The control rod 341 for controlling operation of the pneumatic hammer 338 has a short lever arm 444 fixed to it at the lower end. A pneumatic hammer operating arm 446 is pivotally connected to the end of the lever 444 and carries a cam follower roller 448 on its outer end. A pin 450 extends downwardly from the center of the roller 448. The outer end of the arm 446 is supported by a link 452 pivotally mounted on the same leg 378 as the lever 426. The link 452 is pivotally connected to the arm 446 at 454. A cam 456 comprising substantially a segment of a circle is fixed on the upper surface of the cam wheel 406 and the cam follower roller 448 is urged into engagement with this cam by a spring 458 stretched between the arm 446 and a pin 460 depending from the table 444.

Retrograde movement of the cam wheel 406 such as might be brought about by improper operation of the hand wheel 402 is positively precluded by a pin 462 on the under side of the wheel engageable by a holding pawl 464. The pawl 464 is pivoted at 466 and is urged into position behind the pin 462 by a spring 468. Such movement of the pawl is limited by a pin 470.

Operation

Nut elements 84 with their stub shafts or fins upwardly directed pass down the chute 48 and into the chute 334 (Figs. 31 and 32) as previously set forth, the line of nut elements being retained in the chute or channel 334 by engagement of the foremost nut 84 with the side of the slide 204. The bottom or foremost washer 96 just released from the rod 52 rests on top of the washer positioning member 226 also as shown in Fig. 31. At this time the transfer slide 204 is forwardly positioned as shown in Fig. 23. Retraction of the transfer slide 204 under the control of cams 408 and 410 allows the lowermost nut element 84a to slide into position ahead of the nut positioning member 222 as shown in Figs. 24 and 32 for engagement by the V-shaped leading edge 224 thereof (Figs. 16 and 21). At the same time the foremost washer 96 drops from the top of the washer positioning member 226 into position in the recessed seat 234 in front of the V-shaped edge 236 as shown in Figs.

24 and 32. The nut positioning or back-up member 254 at this time is in retracted position under the influence of spring 250, the nut positioning cam 186 being retracted with the slide 204. The stack of washers 96 on the rod 52 is at this time supported by the washer release member actuating arm 308 as shown in Fig. 35.

Subsequent forward movement of the slide 204 under control of the cams 408 and 410 shifts the washer 96 and nut element 84 to the right to the position shown in Fig. 25. The nut element 84 is positioned exactly against the nut positioning or back-up member 254 which has been raised by the cam end 188 as shown in Fig. 14. The washer 96 passes into and is supported by the gripping mechanism 316. Such forward motion of the transfer slide 204 also causes the cam 238 to cam the washer release member 308 outwardly against the action of spring 312 so that the next lowest washer 96 drops to the top of the washer positioning member 226 from the arm 308 on to which this washer had dropped when the slide was last retracted.

Subsequent retraction of the transfer slide 204 leaves the first washer 96 supported by the gripping mechanism 316 directly above the first nut element 84 which rests on top of the plate 194 above the ejecting port or nozzle 276 as shown in Fig. 26, the back-up member 254 having been lowered to retracted position upon retraction of the transfer slide 204 and associated cam member 186. The next washer element 96 drops into position in the recessed seat 234 and the next nut element 84 slides on to the plate 194 in front of the nut positioning member 222.

Actuation of the valve of the pneumatic hammer 338 upon pivoting of the control rod 341 under the influence of cam 456 allows the entrance of air to the pneumatic hammer through an air line 472 (Fig. 2) to cause the staking plunger 342 to descend from the position shown in Fig. 26 to the positions shown in Figs. 28, 29 and 30. As shown in Fig. 28, under the action of spring 372, the tip 366 and swaging portion 364 of the head 358 pass through the washer recess, the concave section 362 engages the washer body and flange 94 while the thimble 344 engages the washer teeth and the rounded tip 366 passes through the nut element 84. As the staking plunger continues to descend to the position shown in Fig. 29, thimble 344 under the action of the spring 354, forces the washer 96 down the slug 358 from the section 362 and into contact with the nut element 84, the washer skirt or flange 94 fitting within the groove 96 surrounding the nut element stub shaft 90. Engagement of the shoulder 364 with the nut element stub shaft 90 momentarily stops downward movement of the head 358, the sleeve 346 moving downwardly against the force of spring 372, until the head 370 engages the rod 352 and the cylindrical body portion 360 engages the end of the sleeve 346 also as illustrated in Fig. 29.

Continued downward movement of the head 358 under the direct pneumatic pressure of the hammer to the position shown in Fig. 30 causes the thimble 344 to retract against the action of the spring 354 and the shoulder 364 to swage the flange or stub shaft 90 of the nut element 84 outwardly to overlie the flange 94 of the washer 96 and thus trap the washer on the nut element as shown in Fig. 30. The rounded tip 366 of the head fits within a bore 474 in the plate 194 as may be seen in Fig. 27. As the staking plunger thereafter starts to move upwardly the spring 354 forces the permanently assembled unit off of the head 358.

Following return of the staking plunger to its raised position the air valve 434 is actuated by the control cam 410 to discharge a blast of air through the conduit 272 and nozzle 276 and thus blow the assembled nut element and washer unit from the plate 194 over the retracted stop member 254 and into the opening 242 (Fig. 14) from which it passes into a discharge chute 476 for passage to a receptacle (not shown) beneath the table 44.

The cycle depicted in Figs. 24–27 and 28–30 then repeats indefinitely as long as the machine continues in operation.

A control knob 478 (Figs. 1, 14 and 19) is provided for locking the staking plunger in raised position to prevent injury or damage should the pneumatic hammer accidently be operated while adjustments are being made on the apparatus. The rod 352 of the pneumatic hammer is chordally notched and the knob 478 controls movement of a pin fitting in the notch to effect such locking.

Although a particular form of apparatus has been shown for carrying out the principles of my invention, it will be understood that this is for illustrative purposes only. The right to make such changes or modifications as fall within the spirit and scope of the appended claims hereby is expressly reserved.

I claim:

1. Apparatus for assembling washers and flanged nut elements, comprising means for feeding flanged nut elements along a predetermined path, means providing a pair of nut element feeding paths leading from said predetermined path, means for engaging the flanges of nut elements having their flanges oriented in a given direction and directing such nut elements into one of said pair of paths, means for feeding nut elements with their flanges oriented in the opposite direction into the other of said pair of paths, means for feeding the nut elements in one of said pair of paths to an aligning station, means for feeding washers into axial alignment with the nut elements at said aligning station, means for feeding the aligned nut elements and washers to an assembling station, means at said assembling station for holding said nut elements and washers in telescoping position, means for moving said last named feeding means away from said assembling station, and means at said assembling station for thereafter telescoping the axially aligned nut elements and washers.

2. Apparatus for assembling washers and flanged nut elements, comprising a hopper for receiving a random mass of flanged nut elements, means for feeding a succession of nut elements from said hopper along a predetermined path, means providing a pair of paths leading from said predetermined path, means for engaging the flanges of nut elements having their flanges oriented in a given direction and directing such nut elements into one of said pair of paths, means for feeding nut elements with their flanges oriented in the opposite direction into the other of said pair of paths, means for returning the nut elements in one of the pair of paths to the hopper, means for feeding the nut elements in the other of the pair of paths to an aligning station, means for feeding washers into axial alignment with the nut elements at said aligning station, means for feeding the aligned nut elements and washers to an assembling station, means at said assembling station for holding said nut elements and washers in telescoping position, means for moving said last named feeding means away from said assembling station, and means at said telescoping station for thereafter telescoping the axially aligned nut elements and washers.

3. Apparatus for assembling washers and flanged nut elements, comprising means for feeding flanged nut elements along a predetermined path, means defining a pair of paths leading from said predetermined path, means for engaging the flanges of nut elements oriented in one direction for directing such nut elements into one of said pair of paths, means for feeding nut elements with their flanges oriented in the opposite direction into the other of said pair of paths, means for aligning washers with the nut elements from one of said paths, means for transversely shifting the aligned washers and nut elements to an assembly station, means at said assembly station for holding the aligned nut elements and washers in telescoping position upon movement of said shifting means away from said assembly station, and means for thereafter telescoping the aligned nut elements and washers, said telescoping means including means for upsetting the nut element flanges to trap the washers on said nut elements.

4. Apparatus for assembling washers and flanged nut elements, comprising means for feeding flanged nut elements along a predetermined path, means defining a pair of paths leading from said predetermined path, means for engaging the flanges of nut elements oriented in one direction for directing such nut elements into one of said pair of paths, means for feeding nut elements with their flanges oriented in the opposite direction into the other of said pair of paths, means for aligning washers with the nut elements from one of said paths, means for rectilinearly shifting the aligned washers and nut elements transversely to an assembly station, means at said assembly station for holding said washers and nut elements in proper position for telescoping upon movement of said shifting means away from said assembly station, and means for thereafter telescoping the aligned nut elements and washers.

5. Apparatus for assembling washers and flanged nut elements, comprising means for feeding flanged nut elements along a predetermined path, means defining a pair of paths leading from said predetermined path, means for engaging the flanges of nut elements having their flanges located in a given direction and directing such nut elements into one of said pair of paths, means for feeding nut elements with their flanges oriented in the opposite direction into the other of said pair of paths, means for feeding washers into spaced apart axial alignment with nut elements from one of said pair of paths, means for telescoping aligned nut elements and washers, means for transversely shifting the aligned nut elements and washers to said telescoping means, and means receiving the aligned nut elements and washers from said shifting means for holding in position for telescoping.

6. Apparatus for assembling washers and flanged nut elements, comprising means for feeding a succession of nut elements with their flanges oriented in a given direction along a predetermined path, means for feeding a succession of washers along a predetermined path arranged at a substantial angle relating to the nut element feeding path into axial alignment with said nut elements and confronting the flanged ends of said nut elements, means for telescoping the aligned washers and nut elements, means for rectilinearly shifting the aligned washers and nut elements substantially at right angles to both of said predetermined paths to said telescoping means, and means receiving the aligned nut elements and washers from said shifting means for holding in proper position for telescoping.

7. Apparatus for assembling washers and flanged nut elements, comprising means for feeding a succession of flanged nut elements along a predetermined path, means for feeding a succession of washers into axial alignment with the nut elements and spaced from the flanged ends thereof, means for telescoping aligned nut elements and washers, said telescoping means including means for swaging the nut element flanges outwardly to trap said washers permanently on said nut elements, means for transversely shifting the aligned and spaced nut elements and washers to said telescoping means, and means receiving the aligned nut elements and washers from said shifting means for holding them in spaced position for telescoping.

8. The method of assembling washers and flanged nut elements which comprises feeding nut elements along a predetermined path, engaging the flanges of nut elements oriented in a given direction for feeding those nut elements along a second predetermined path, bringing the nut elements in said second predetermined path into predetermined spaced axial alignment with a succession of washers at a delivery station, shifting the aligned and spaced nut elements and washers transversely of their axes to a telescoping station, holding the nut elements and washers at said telescoping station in the predetermined spaced axial alignment while preparing to feed additional nut elements and washers to said telescoping station, and thereafter bringing the nut elements and washers into telescopic association.

9. The method of assembling washers and flanged nut elements which comprises feeding a succession of flanged nut elements and washers into axially aligned relation with the washers spaced from the flanged ends of the nut elements at a delivery station, shifting the aligned and spaced nut elements and washers transversely of their axes away from the delivery station, receiving the shifted aligned nut elements and washers and holding them in spaced position for telescoping while preparing to shift additional nut elements and washers, thereafter relatively shifting the aligned nut elements and washers into interfitting relation, and substantially simultaneously swaging the nut element flanges permanently to trap the washers on the nut elements.

10. Apparatus for assembling washers and nut elements, comprising a carrier adapted to carry a nut element and a washer in axially aligned, spaced apart relation, means for feeding a succession of nut elements to said carrier, means for supporting a stack of washers, means for transferring washers from the stack supported by said stack supporting means to said carrier at a delivery station in axial alignment with said nut elements and spaced from said nut elements, means for shifting the axially aligned, spaced apart washers and nut elements relatively toward one another and into telescopic association, means associated with said telescopic association means for holding the aligned, spaced apart washers for telescoping, means for operating said carrier to shift the aligned, spaced apart washers and nut elements away from said delivery station to the holding means associated with said telescopic associating means, and means for moving said carrier away from said telescopic associating means before telescoping of aligned washers and nut elements.

11. Apparatus for assembling washers and nut elements, comprising a horizontally reciprocable slide adapted to carry aligned washers and nut elements, means for feeding a succession of nut elements to said slide, means for supporting a stack of washers, means for transferring washers in succession from the stack supported by said stack supporting means to said slide at a delivery station in axial alignment with and axially spaced from said nut elements, means for telescopically associating aligned washers and nut elements, said telescopically associating means including means for maintaining said washers and nut elements in axially spaced relation, means for reciprocating said slide to shift the aligned washers and nut elements away from said delivery station to said telescopic associating means, and means for reciprocating said slide away from the telescoping means leaving the washers and nut elements in said maintaining means for telescoping.

12. Apparatus for assembling washers and nut elements, comprising a reciprocable slide having a washer receiving recess in its upper surface and a nut element receiving recess in its lower surface aligned with the washer receiving recess, a plate underlying said slide for supporting nut elements in the nut element receiving recess, means for supplying nut elements one by one to said nut element receiving recess, means for supporting a stack of washers above said slide, means for releasing washers one by one from a stack supported by said stack supporting means into said washer receiving recess, a washer gripping mechanism located above said supporting plate, means for reciprocating said slide to transfer a washer to said gripping mechanism and to position a nut element on said plate beneath the gripped washer in axial alignment therewith, means for retracting said slide, and means for thereafter carrying the gripped washer downwardly into telescopic association with the aligned nut element.

13. Apparatus for assembling washers and nut elements comprising a reciprocable slide having a washer receiving recess in its upper surface and a nut element receiving recess in its lower surface, a substantially vertical rod overlying said slide, a latch member having a detent thereon carried by said rod, means resiliently urging said detent outwardly of said rod to support a stack of washers on said rod, a tube encircling the lower portion of said rod for centralizing washers, said tube having a lateral aperture, an escapement member aligned with said aperture and adapted to project therethrough into contact with said latch member to retract said detent, the escapement member lying below said detent by no greater than the thickness of a washer for supporting the washers on said rod with said detent retracted, means for telescopically associating washers and nut elements, means for reciprocating said slide to deliver washers and nut elements to said telescopic associating means, and means for operating said escapement member in timed relation with said slide.

14. Apparatus for assembling washer elements and nut elements, comprising a nut element supporting plate, a gripper mechanism above said supporting plate for gripping a washer element, means for supplying a succession of aligned washer elements and nut elements to said gripper mechanism and said supporting plate respectively in axially spaced relation, reciprocable means above said gripper mechanism for telescopically associating said elements, means for reciprocating said telescopic associating means, the telescopic associating means including a tip adapted to swage one of said elements to retain said elements in permanently telescoped relation, a sleeve encircling said tip and interfitting with said gripper mechanism to force a washer element from said gripper mechanism into engagement with a nut element on said plate, and spring means urging said sleeve forwardly of said tip and permitting retraction of said sleeve relative to said tip for swaging of one of said elements.

15. Apparatus for assembling washers and longitudinally asymmetric nut elements comprising means for feeding a succession of nut elements longitudinally oriented in a given direction along a predetermined path, means for feeding a succession of washers along a predetermined path into spaced axial alignment with said nut elements and confronting a predetermined end thereof, means for telescoping the aligned washers and nut elements, means for shifting the spaced and aligned washers and nut elements to said telescoping means, and means associated with said telescoping means receiving the aligned nut elements and washers from said shifting means for holding the aligned and spaced nut elements and washers in spaced position for telescoping.

16. Apparatus for assembling washers and nut elements, comprising a reciprocable slide having a washer receiving recess in its upper surface and a nut element receiving recess in its lower surface aligned with the washer receiving recess, means for supplying nut elements one by one to said nut element receiving recess, means for supplying washers one by one to the washer receiving recess, a gripping mechanism and a support, means for reciprocating said slide to transfer a washer to one of said gripping mechanism and said support and a nut element to the other of said gripping mechanism and support in axial alignment, means for retracting said slide, and means for thereafter telescoping the washer and aligned nut element.

17. Apparatus for assembling washers and nut elements, and comprising means for feeding a succession of nut elements and washers into predetermined axially spaced alignment, a nut element supporting plate, a gripper mechanism above said supporting plate for gripping a washer element, transfer means for supplying a succession of washer elements to said gripper mechanism and for supplying a succession of nut elements to said supporting plate in the predetermined axially spaced alignment, means for withdrawing the transfer means, and means for telescopically associating the aligned elements on said supporting plate and gripper mechanism respectively.

18. Apparatus for assembling washers and nut elements comprising means for feeding a succession of nut elements to an aligning station, means for feeding a succession of washers along a predetermined path into predetermined axial alignment with said nut elements at said aligning station, means for transferring the axially aligned washers and nut elements from said aligning station to a telescoping station, means at said telescoping station for receiving the aligned nut elements and washers from said transferring means and holding said nut elements and washers in axial alignment, means for moving the transfer means away from said telescoping station while leaving the aligned nut elements and washers at said telescoping station in said predetermined axial alignment, and means for telescoping the aligned nut elements and washers at said telescoping station.

19. Apparatus as claimed in claim 18, wherein there is provided means at the aligning station for aligning the nut elements and washers in axially spaced relation, said receiving and holding means at the telescoping station holding the nut elements and washers in axially spaced alignment, and said telescoping means carrying said aligned nut elements and washers into engagement.

20. Apparatus as claimed in claim 19, wherein the receiving and holding means includes a gripper mechanism engaging one of each aligned nut element and washer.

References Cited in the file of this patent

UNITED STATES PATENTS

| Number | Name | Date |
|---|---|---|
| 828,682 | Rodd | Aug. 14, 1906 |
| 1,047,026 | Flounders | Dec. 10, 1912 |
| 1,156,434 | Raptias | Oct. 12, 1915 |
| 1,445,296 | Clark | Feb. 13, 1923 |
| 1,456,216 | Brightman | May 22, 1923 |
| 1,644,999 | Hardiman | Oct. 11, 1927 |
| 1,861,889 | Stoll | June 7, 1932 |
| 1,863,223 | Kantor | June 14, 1932 |
| 1,883,068 | Stoll | Oct. 18, 1932 |
| 1,897,116 | Friedman | Feb. 14, 1933 |
| 1,914,313 | Wales | June 13, 1933 |
| 1,929,146 | Lidberg | Oct. 3, 1933 |
| 1,958,180 | Brackett | May 8, 1934 |
| 2,070,032 | Swanstrom | Feb. 9, 1937 |
| 2,270,713 | Belada | Jan. 20, 1942 |
| 2,303,225 | Olson | Nov. 24, 1942 |
| 2,307,132 | Hufferd | Jan. 5, 1943 |
| 2,350,486 | Bailey | June 6, 1944 |
| 2,398,659 | Mead | Apr. 16, 1946 |
| 2,435,589 | Hoffecker et al. | Feb. 10, 1948 |